US009279473B2

(12) United States Patent
Matsushita

(10) Patent No.: US 9,279,473 B2
(45) Date of Patent: Mar. 8, 2016

(54) FLUID-FILLED CYLINDRICAL VIBRATION-DAMPING DEVICE

(75) Inventor: Toru Matsushita, Komaki (JP)

(73) Assignee: SUMITOMO RIKO COMPANY LIMITED, Aichi (JP)

( * ) Notice: Subject to any disclaimer, the term of this patent is extended or adjusted under 35 U.S.C. 154(b) by 343 days.

(21) Appl. No.: 13/609,814

(22) Filed: Sep. 11, 2012

(65) Prior Publication Data
US 2013/0062822 A1 Mar. 14, 2013

(30) Foreign Application Priority Data

Sep. 14, 2011 (JP) ................................. 2011-200539

(51) Int. Cl.
*F16F 7/00* (2006.01)
*F16F 13/14* (2006.01)
*F16M 1/00* (2006.01)
*F16F 15/16* (2006.01)
(Continued)

(52) U.S. Cl.
CPC ......... *F16F 13/1463* (2013.01); *F16F 13/1409* (2013.01); *F16F 9/3207* (2013.01); *F16F 9/49* (2013.01); *F16F 9/58* (2013.01); *F16F 15/161* (2013.01)

(58) Field of Classification Search
CPC ............... F16F 5/00; F16F 7/00; F16F 7/087; F16F 9/00; F16F 9/10; F16F 9/32; F16F 9/3207; F16F 9/34; F16F 9/49; F16F 9/58; F16F 13/00; F16F 15/10; F16F 15/12; F16F 15/124; F16F 15/16; F16F 15/161; F16F 2222/12; F16F 13/1463; F16F 13/1409
USPC ........... 267/140.11, 141, 141.1, 141.2, 141.3, 267/141.4, 141.5; 248/562, 636, 638
See application file for complete search history.

(56) References Cited

U.S. PATENT DOCUMENTS 5,188,346 A * 2/1993 Hamada et al. .......... 267/140.12
5,333,847 A * 8/1994 Kanda ....................... 267/140.12
(Continued)

FOREIGN PATENT DOCUMENTS

CN 1683806 10/2005
JP 64-003340 1/1989
(Continued)

OTHER PUBLICATIONS

Concise Explanation of Relevancy of JP 2-76240.
China Office action, dated Mar. 31, 2014 along with an english translation thereof.
Japan Office action, dated Feb. 3, 2015 along with an English translation thereof.

*Primary Examiner* — Melody Burch
(74) *Attorney, Agent, or Firm* — Greenblum & Bernstein, PLLC

(57) ABSTRACT

A fluid-filled cylindrical vibration-damping device including at least one orifice member attached to an inside of an outer cylindrical member so as to straddle openings of pocket portions and extend in a circumferential direction. An orifice passage is defined by covering an orifice forming groove of the orifice member with the outer cylindrical member. A stopper mechanism is constituted by contact between an inner shaft member and the outer cylindrical member via the orifice member. A reinforcing rib is formed in the orifice member so as to project from a bottom face of the orifice forming groove and extend in the circumferential direction while a projecting distal end face thereof is in contact with the outer cylindrical member. The reinforcing rib partitions at least a portion of a circumference of the orifice passage into a plurality of passages that have same fluid flow characteristics.

10 Claims, 8 Drawing Sheets

(51) Int. Cl.
*F16F 9/32* (2006.01)
*F16F 9/58* (2006.01)
*F16F 9/49* (2006.01)

(56) References Cited

U.S. PATENT DOCUMENTS

| | | | |
|---|---|---|---|
| 7,763,336 B2 * | 7/2010 | Clarke et al. | 428/36.9 |
| 7,866,639 B2 | 1/2011 | Endo | |
| 2004/0239020 A1 | 12/2004 | Ito | |
| 2006/0163785 A1 * | 7/2006 | Goudie | 267/141.5 |
| 2009/0189323 A1 | 7/2009 | Endo | |
| 2009/0200719 A1 * | 8/2009 | Kato et al. | 267/140.12 |

FOREIGN PATENT DOCUMENTS

| | | |
|---|---|---|
| JP | 64-003341 | 1/1989 |
| JP | 01-171942 | 12/1989 |
| JP | 2-76240 | 6/1990 |
| JP | 5-280580 | 10/1993 |
| JP | 2001-41276 | 2/2001 |
| JP | 2001-159445 | 6/2001 |
| JP | 2005-76751 | 3/2005 |

\* cited by examiner

FLUID-FILLED CYLINDRICAL VIBRATION-DAMPING DEVICE

INCORPORATED BY REFERENCE

The disclosure of Japanese Patent Application No. 2011-200539 filed on Sep. 14, 2011 including the specification, drawings and abstract is incorporated herein by reference in its entirety.

BACKGROUND OF THE INVENTION

1. Field of the Invention

The present invention relates generally to a cylindrical vibration-damping device adapted for use as a suspension bushing that connects a suspension and a vehicle body, for example, and more particularly to a cylindrical vibration-damping device of fluid-filled type, which utilizes vibration damping effects based on the flow action of a fluid filling the interior.

2. Description of the Related Art

Conventionally, as one type of cylindrical vibration-damping devices applied for automotive suspension bushings or the like, there is known a fluid-filled cylindrical vibration-damping device which utilizes vibration damping effects on the basis of the flow action of the fluid filling the interior. This fluid-filled cylindrical vibration-damping device includes: an inner shaft member; an outer cylindrical member externally fitted onto the inner shaft member; a main rubber elastic body elastically connecting the inner shaft member and the outer cylindrical member, and having a plurality of pocket portions that open onto the outer peripheral face of the main rubber elastic body; a plurality of fluid chambers defined by covering the pocket portions with the outer cylindrical member and filled with a non-compressible fluid; and an orifice passage interconnecting the fluid chambers. Such a fluid-filled cylindrical vibration-damping device is disclosed in Japanese Unexamined Patent Publication No. JP-A-5-280580, for example.

In some cases, the fluid-filled cylindrical vibration-damping device employs an orifice member disposed to the inner peripheral side of the outer cylindrical member for providing the orifice passage. This orifice member extends a prescribed length in the circumferential direction while straddling the fluid chambers. Moreover, the orifice member has an orifice forming groove that opens onto the outer peripheral face thereof. The orifice passage is formed by covering the opening of the orifice forming groove with the outer cylindrical member.

Also, the fluid-filled cylindrical vibration-damping device sometimes employs a stopper mechanism for limiting relative displacement of the inner shaft member and the outer cylindrical member in the axis-perpendicular direction with the aim of improving durability of the main rubber elastic body or the like. The stopper mechanism is adapted to limit relative displacement of the inner shaft member and the outer cylindrical member by means of contact therebetween.

However, if the stopper mechanism is provided to the structure in which the orifice member is disposed to the inner peripheral side of the outer cylindrical member, the inner shaft member will strike the orifice member. Consequently, this may cause the problem that the orifice member is damaged especially in the formation zone of the orifice forming groove where a gap (the orifice passage) is formed between the orifice member and the inner peripheral face of the outer cylindrical member.

On the other hand, as disclosed in JP-A-5-280580, if a structure is employed in which the contact force between the inner shaft member and the outer cylindrical member will not exert on the orifice member, it is necessary to provide means such as further employing an intermediate sleeve between the inner shaft member and the outer cylindrical member for protecting the orifice member or the like. This may cause problems such as an increased number of components, an increased weight in association therewith, and complicated construction.

SUMMARY OF THE INVENTION

It is therefore one object of this invention to provide a fluid-filled cylindrical vibration-damping device of novel construction which is able to ensure durability of the orifice member with respect to input of the stopper load, through a simple structure with a small number of parts.

Specifically, a first mode of the present invention provides a fluid-filled cylindrical vibration-damping device including: an inner shaft member; an outer cylindrical member; a main rubber elastic body elastically connecting the inner shaft member and the outer cylindrical member, and having a plurality of pocket portions that open onto an outer peripheral face of the main rubber elastic body; a plurality of fluid chambers defined by covering the pocket portions with the outer cylindrical member and filled with a non-compressible fluid; at least one orifice member attached to an inner peripheral side of the outer cylindrical member so as to straddle openings of the pocket portions and extend in a circumferential direction, the orifice member having an orifice forming groove that opens onto an outer peripheral face of the orifice member and extends in the circumferential direction; an orifice passage for interconnecting the fluid chambers defined by covering an outer peripheral side opening of the orifice forming groove with the outer cylindrical member; and a stopper mechanism for limiting relative displacement of the inner shaft member and the outer cylindrical member in an axis-perpendicular direction being constituted by contact between the inner shaft member and the outer cylindrical member via the orifice member, wherein a reinforcing rib is formed in the orifice member so as to project from an inner peripheral bottom face of the orifice forming groove toward an outer peripheral side and extend in the circumferential direction while a projecting distal end face of the reinforcing rib is in contact with an inner peripheral face of the outer cylindrical member; and wherein the reinforcing rib partitions at least a portion of a circumference of the orifice passage into a plurality of passages that have same fluid flow characteristics.

With the fluid-filled cylindrical vibration-damping device of construction according to the first mode, the strength of the orifice member is enhanced by the reinforcing rib. Therefore, even with the structure in which the orifice member is disposed between the inner shaft member and the outer cylindrical member so as to limit relative displacement of the inner shaft member and the outer cylindrical member by contact between the inner shaft member and the orifice member, it is possible to avoid damage to the orifice member due to contact by the inner shaft member. As a result, the stopper mechanism is able to effectively limit the relative displacement of the inner shaft member and the outer cylindrical member, thereby ensuring durability of the main rubber elastic body as well as durability of the orifice member. Thus, desired vibration damping ability will be stably obtained.

Moreover, the reinforcing rib is formed so as to project from the bottom face of the orifice forming groove. Accordingly, the orifice member is reinforced with the reinforcing rib at the thin-walled portion having reduced strength. Consequently, even with the structure in which the stopper mechanism is constituted by contact between the inner shaft member and the orifice member, durability of the orifice member with respect to input of the stopper load will be sufficiently ensured.

In addition, the projecting distal end face of the reinforcing rib is in contact with the inner peripheral face of the outer cylindrical member. With this arrangement, when the inner shaft member comes into contact against the orifice member, deformation of the orifice member toward the outer peripheral side will be limited by contact of reinforcing rib with the outer cylindrical member. This makes it possible to prevent damage to the orifice member such as cracking caused by its excessive deformation.

Furthermore, the plurality of passages formed by the reinforcing rib partitioning the orifice passage have the same fluid flow characteristics (flow resistance, resonance frequency of the flowing fluid, or the like) as one another. Accordingly, at times of vibration input, fluid flow will be produced substantially equally in each passage. By so doing, the entire orifice passage is endowed with a passage cross sectional area which is the sum of cross sectional areas of all passages, thereby maintaining the intended tuning frequency. Thus, improvement of durability of the orifice member by providing the reinforcing rib will be realized while maintaining desired vibration damping characteristics.

A second mode of the present invention provides the fluid-filled cylindrical vibration-damping device according to the first mode wherein the reinforcing rib partitions at least the portion of the circumference of the orifice passage into sections equal in size with one another in an axial direction.

According to the second mode, the plurality of passages partitioned by the reinforcing rib are substantially identical with one another in shape and have substantially the same fluid flow characteristics as one another. Consequently, during input of vibration, fluid flow will be produced substantially similarly in each passage. With this arrangement, these passages function as a single passage. This will minimize influence of the presence of the reinforcing rib on the tuning frequency or the like of the orifice passage, thereby effectively attaining desired vibration damping characteristics.

A third mode of the present invention provides the fluid-filled cylindrical vibration-damping device according to the first or second mode wherein the reinforcing rib is formed at an axially center section of the orifice forming groove and extends in the circumferential direction.

According to the third mode, the reinforcing rib is formed at the axially center section of the orifice forming groove. Thus, the two sections situated opposite sides of the reinforcing rib have substantially equal dimension in the axial direction. Therefore, at times of input of the stopper load, flexural deformation of the orifice member at the formation zone of the orifice forming groove will be reduced, thereby enhancing durability of the orifice member.

A fourth mode of the present invention provides the fluid-filled cylindrical vibration-damping device according to any one of the first through third modes wherein the reinforcing rib is formed in a circumferentially medial section of the orifice forming groove.

According to the fourth mode, the reinforcing rib is formed in the circumferentially medial section of the orifice forming groove so that the reinforcing rib does not reach the circumferential opposite ends of the orifice forming groove. This arrangement makes it possible to reduce flow resistance of the fluid in the orifice forming groove at the connected sections to the fluid chambers which are situated in the circumferential opposite ends of the orifice forming groove, owing to absence of the reinforcing rib. Therefore, at the connected sections between the orifice passage and the fluid chambers, at which the fluid flow is likely to be inhibited due to occurrence of turbulence or the like, the fluid will more smoothly flow into/out of the orifice passage. As a result, it is possible to minimize decrease in the amount of fluid flow through the orifice passage caused by presence of the reinforcing rib, thereby effectively obtaining vibration damping action based on the flow action of the fluid.

Besides, by setting the stopper load so as to input to the circumferentially medial section of the orifice member, the reinforcing rib will support the stopper load, thereby minimizing deformation of the orifice member. Moreover, since the reinforcing rib is formed only in the circumferentially medial section of the orifice forming groove, increase in the mass due to presence of the reinforcing rib will be minimized A fifth mode of the present invention provides the fluid-filled cylindrical vibration-damping device according to any one of the first through fourth modes, further including a tubular intermediate sleeve having a pair of window portions, wherein the inner shaft member and the intermediate sleeve are elastically connected by the main rubber elastic body; wherein the pocket portions of the main rubber elastic body comprise a pair of the pocket portions and open toward the outer peripheral side through the respective window portions of the intermediate sleeve; wherein the fluid chambers comprise a pair of the fluid chambers defined by the outer cylindrical member fitting externally onto the intermediate sleeve while covering the window portions; wherein the at least one orifice member comprises a pair of the orifice members each extending a length approximately equal to halfway around a circumference and being disposed so as to straddle the respective window portions in the circumferential direction; and wherein two circumferential ends of each of the orifice members are clasped between the intermediate sleeve and the outer cylindrical member.

With the fluid-filled cylindrical vibration-damping device of construction according to the fifth mode as well, the reinforcing rib is able to enhance the strength of the orifice member. Thus, damage to the orifice member caused by contact with the inner shaft member will be prevented.

In addition, the orifice member comprises a pair of the orifice members each extending a length approximately equal to halfway around the circumference and being disposed so as to straddle the respective window portions. This arrangement makes it easy to attach the orifice members. Also, the orifice members will be stably supported by being clasped between the outer cylindrical member and the intermediate sleeve.

According to the present invention, the orifice member includes the reinforcing rib that projects from the bottom face of the orifice forming groove and is in contact with the outer cylindrical member. Consequently, with the construction which exhibits stopper effect by contact of the inner shaft member against the outer cylindrical member via the orifice member, the strength of the orifice member is enhanced. This will improve durability of the orifice member particularly at the thin-walled portion where the orifice forming groove is formed. Furthermore, the reinforcing rib partitions the orifice passage into a plurality of passages that have same fluid flow characteristics, so that the cross sectional area of the orifice passage becomes the sum of cross sectional areas of these passages. This will minimize change in tuning frequency due to presence of the reinforcing rib. In this way, the fluid-filled cylindrical vibration-damping device according to the present invention is able to obtain sufficient strength of the orifice member owing to the reinforcing rib while maintaining desired vibration damping characteristics.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
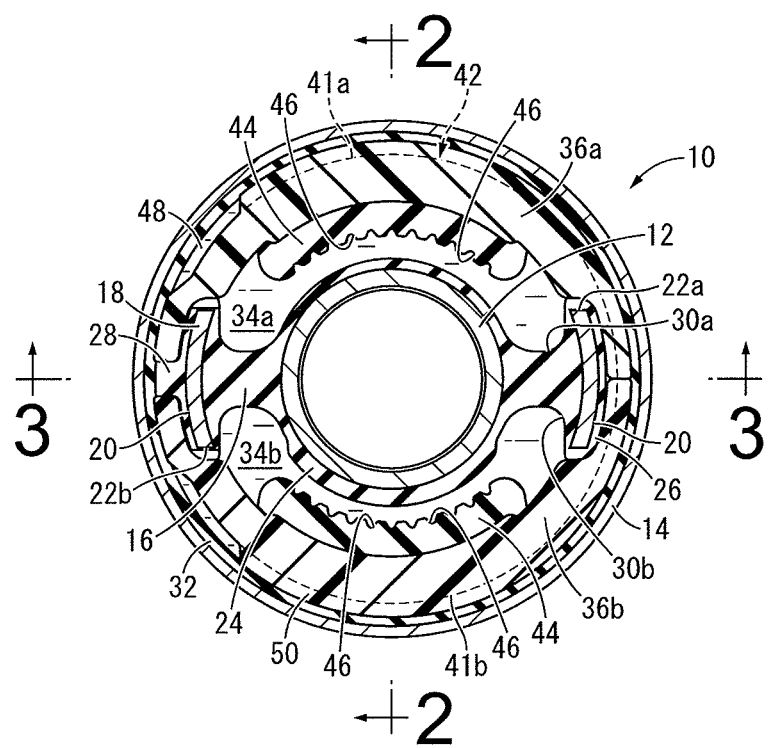
FIG. 1 is a vertical cross sectional view showing a fluid-filled cylindrical vibration-damping device in the form of a suspension bushing as a first embodiment of the present invention, taken along line 1-1 of FIG. 2.
Figure 2:
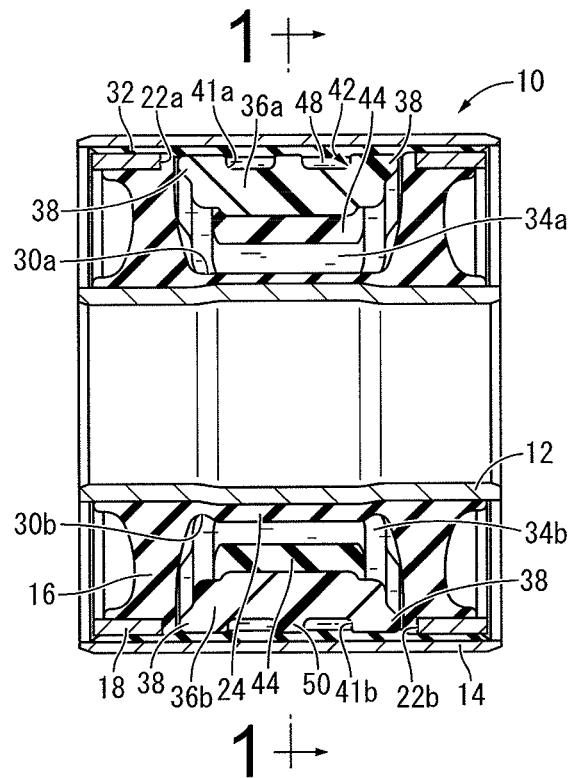
FIG. 2 is a cross sectional view taken along line 2-2 of FIG. 1.
Figure 3:
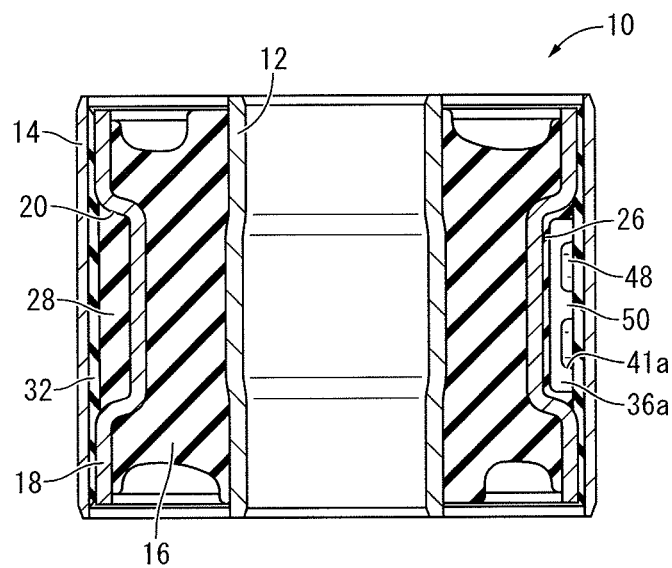
FIG. 3 is a cross sectional view taken along line 3-3 of FIG. 1.
Figure 4:
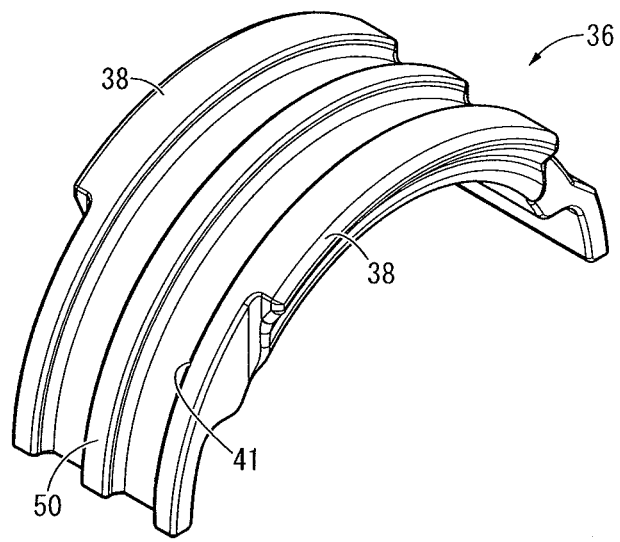
FIG. 4 is a perspective view of an orifice member of the suspension bushing of FIG. 1.
Figure 5:
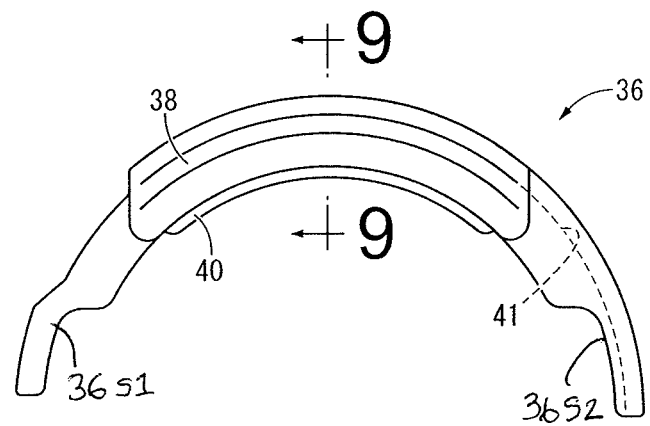
FIG. 5 is a front elevational view of the orifice member of FIG. 4.

Referring to FIGS. 1 through 3, there is depicted an automotive suspension bushing 10 according to a first embodiment of a fluid-filled cylindrical vibration-damping device constructed in accordance with the present invention. The suspension bushing 10 has a construction in which an inner shaft member 12 and an outer cylindrical member 14 are elastically connected by a main rubber elastic body 16. Then, the inner shaft member 12 is mounted onto a vehicle body (not shown) while the outer cylindrical member 14 is mounted onto a suspension arm (not shown), so as to provide vibration damped linkage of the suspension arm to the vehicle body. In the description hereinbelow, as a general rule, the vertical direction refers to the vertical direction in FIG. 1. Also, the lateral direction refers to the lateral direction in FIG. 1.

Described more specifically, the inner shaft member 12 is a high rigidity component having a small-diameter, generally cylindrical shape with its center section slightly made larger in diameter.

An intermediate sleeve 18 is externally fitted onto the inner shaft member 12. The intermediate sleeve 18 is a high rigidity component having thin-walled, large-diameter, generally round tubular shape, and includes a mating recessed groove 20 at the axially center section thereof. The mating recessed groove 20 opens onto the outer peripheral face of the intermediate sleeve 18 and extends in the circumferential direction. Additionally, the intermediate sleeve 18 includes a pair of window portions 22a, 22b. The window portions 22a, 22b are holes which perforate the axially center section of the intermediate sleeve 18 in the axis-perpendicular direction, and are respectively provided to opposite sides in the diametrical direction. The window portions 22a, 22b extend outward from the mating recessed groove 20 in the axial direction, so that the mating recessed groove 20 is divided into two sections in the circumferential direction by the window portions 22a, 22b.

Then, the inner shaft member 12 and the intermediate sleeve 18 are elastically connected by the main rubber elastic body 16. The main rubber elastic body 16 has a thick-walled, generally round tubular shape and is arranged with its inner peripheral face superposed and bonded by vulcanization to the outer peripheral face of the inner shaft member 12 while with its outer peripheral face superposed and bonded by vulcanization to the inner peripheral face of the intermediate sleeve 18. In the present embodiment, the main rubber elastic body 16 takes the form of an integrally vulcanization molded component incorporating the inner shaft member 12 and the intermediate sleeve 18.

A thin-walled, tubular cushioning rubber 24 is bonded by vulcanization to the outer peripheral face of the inner shaft member 12. The cushioning rubber 24 is made thicker on the side of a pocket portion 30b (described later) rather than on the side of a pocket portion 3 (described later).

Besides, a rubber sheath layer 26 integrally formed with the main rubber elastic body 16 covers the mating recessed groove 20. In addition, a dividing wall 28 is provided in the circumferentially center section of one of the two sections of the mating recessed groove 20. The dividing wall 28 is integrally formed with the rubber sheath layer 26 and projects to the outer peripheral side.

Moreover, a pair of pocket portions 30a, 30b are formed in the main rubber elastic body 16. The pocket portions 30a, 30b are recesses that open onto the outer peripheral face of the main rubber elastic body 16, and are positioned on the diametrically opposite sides of the inner shaft member 12. With regard to the integrally vulcanization molded component of the main rubber elastic body 16, the pair of pocket portions 30a, 30b open toward the outer peripheral side through the respective window portions 22a, 22b of the intermediate sleeve 18. Note that the opening of the pocket portions 30a, 30b is made slightly smaller than that of the window portions 22a, 22b of the intermediate sleeve 18, so that the rim of the opening of the pocket portions 30a, 30b is bonded by vulcanization to the intermediate sleeve 18 so as to cover the rim of the opening of the window portions 22a, 22b.

Then, the outer cylindrical member 14 is attached to the integrally vulcanization molded component of the main rubber elastic body 16. The outer cylindrical member 14 has a thin-walled, large-diameter, generally cylindrical shape, with its inner peripheral face covered with a seal rubber layer 32. After being externally fitted onto the intermediate sleeve 18, the outer cylindrical member 14 is subjected to a diameter reduction process such as 360-degree radial compression, thereby being secured fitting onto the intermediate sleeve 18. Note that the seal rubber layer 32 affixed to the outer cylindrical member 14 is pinched and compressed between the outer cylindrical member 14 and the two axial ends of the intermediate sleeve 18, thereby providing fluid-tight seal between the securely fitted faces of the outer cylindrical member 14 and the intermediate sleeve 18 over the entire circumference.

Furthermore, the outer cylindrical member 14 closes off the window portions 22a, 22b so as to fluid-tightly cover the opening of the pocket portions 30a, 30b. With this arrangement, a pair of fluid chambers 34a, 34b are formed by utilizing the pair of pocket portions 30a, 30b, which are sealed off from the external space and have a non-compressible fluid enclosed in the interior. While the non-compressible fluid to be enclosed within the fluid chambers 34a, 34b is not limited in particular, water, an alkylene glycol, a polyalkylene glycol, silicone oil, or a mixture of these, for example, would preferably be employed. In addition, in order to advantageously achieve vibration damping effect based on flow behavior of the fluid, it is desirable to use a low-viscosity fluid having viscosity of 0.1 Pa·s or lower.

Figure 6:
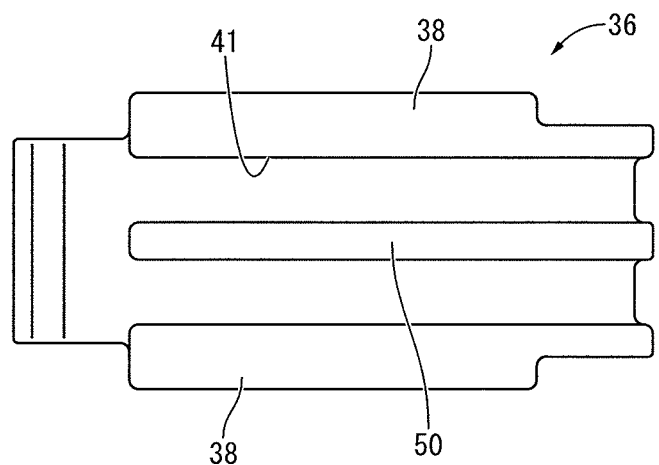
FIG. 6 is a top plane view of the orifice member of FIG. 5.
Figure 7:
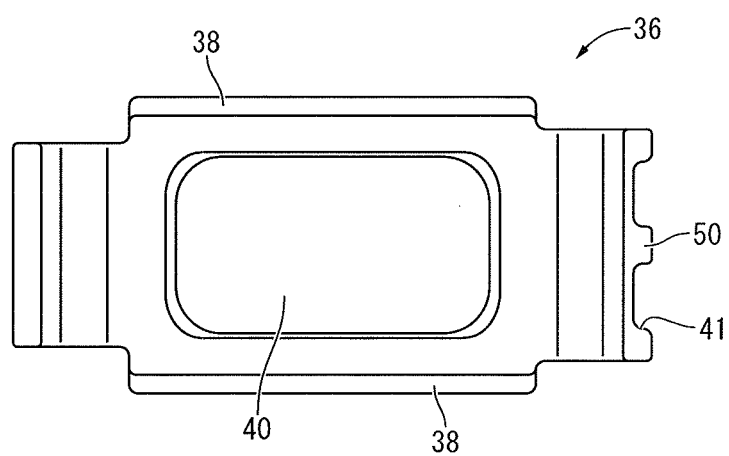
FIG. 7 is a bottom plane view of the orifice member of FIG. 5.
Figure 8:
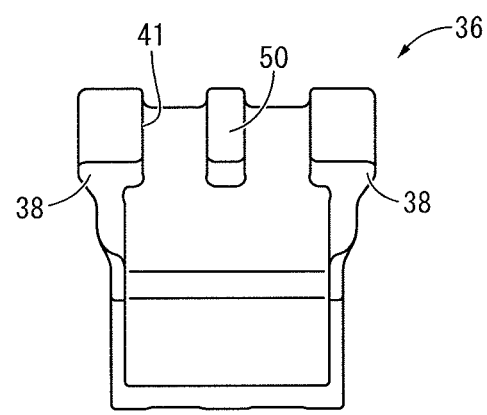
FIG. 8 is a left side view of the orifice member of FIG. 5.
Figure 9:
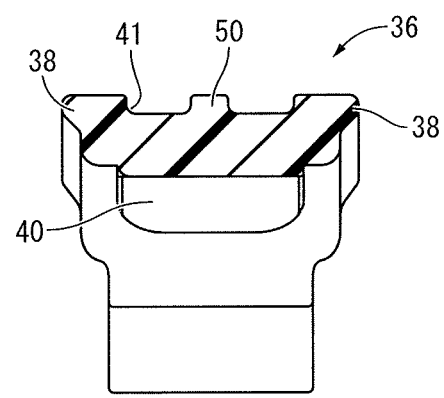
FIG. 9 is a cross sectional view taken along line 9-9 of FIG. 5.
Figure 10:
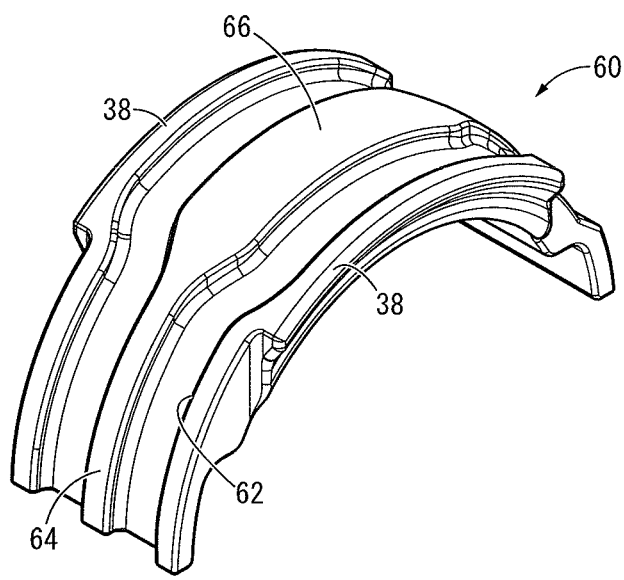
FIG. 10 is a perspective view of an orifice member of a suspension bushing according to a second embodiment of the present invention.

Additionally, orifice members 36a, 36b are disposed to the inner peripheral side of the outer cylindrical member 14. As depicted in FIGS. 4 through 9, the orifice member 36 is a component of generally semicircular tube shape extending a length approximately equal to halfway around the circumference, and is made of rigid synthetic resin. The orifice member 36 includes a pair of projecting portions 38, 38 that are integrally formed with its circumferentially center section and projects outward in the axial direction. Further, the orifice member 36 has step portions 36 s1 and 36 s2 at both circumferential end sections. The step portions engage a portion of the main rubber elastic body that surrounds the respective window portions of the intermediate sleeve, as can be appreciated from FIGS. 1 and 5. Moreover, the orifice member 36 is made thinner in its two circumferential ends than in its circumferentially medial section, so that the inner peripheral side of the two circumferential ends is concaved so as to have a notch shape. As depicted in FIG. 7, the circumferentially center section of the orifice member 36, which has axially wider width owning to presence of the projecting portions 38, includes an anchor portion 40 of convex shape projecting from the inner peripheral face thereof.

Besides, a divided orifice groove 41 is provided to the orifice member 36. The divided orifice groove 41 is a recessed groove that opens onto the outer peripheral face of the orifice member 36 and extends in the circumferential direction. As depicted in FIG. 6, one circumferential end of the divided orifice groove 41 opens onto the circumferential end face of the orifice member 36, while the other circumferential end thereof opens onto the two axial end faces of the orifice member 36.

Further, a stopper rubber 44 is attached to the orifice member 36. As depicted in FIGS. 1 and 2, the stopper rubber 44 has a generally curving plate shape, and includes on its inner peripheral face a plurality of grooves 46 that are formed at given intervals in the circumferential direction and extend in the axial direction. The stopper rubber 44 is superposed and anchored onto the inner peripheral face of the orifice member 36. Note that the stopper rubber 44 is anchored to the orifice member 36 so as to cover the anchor portion 40, and goes outward from the anchor portion 40 in the axial direction as well as in the circumferential direction. By so doing, the stopper rubber 44 is positioned with respect to the orifice member 36 in the axial direction as well as in the circumferential direction.

Then, the pair of orifice members 36a, 36b are attached so as to clasp the integrally vulcanization molded component of the main rubber elastic body 16 from the opposite sides in one diametrical direction along which the pair of pocket portions 30a, 30b are situated. Accordingly, the orifice members 36a, 36b are disposed so as to straddle the respective pocket portions 30a, 30b in the circumferential direction. Moreover, the two circumferential ends of each of the orifice members 36a, 36b are fitted into the mating recessed groove 20 of the intermediate sleeve 18.

It should be appreciated that the orifice member 36a and the orifice member 36b are identical with each other in shape. Therefore, by being vertically inverted with respect to each other, the orifice members 36a, 36b are attached to the integrally vulcanization molded component of the main rubber elastic body 16 from the opposite sides in the diametrical direction. In this way, by disposing the orifice member 36a and the orifice member 36b vertically inverted with respect to each other, the divided orifice groove 41a of the orifice member 36a and the divided orifice groove 41b of the orifice member 36b are circumferentially interconnected at the openings on the circumferential end face side. With this arrangement, an orifice forming groove 42 is provided by the divided orifice groove 41a and the divided orifice groove 41b, and extends just short of once around the circumference. One circumferential end of the orifice forming groove 42 communicates with the pocket portion 30a, while the other circumferential end thereof communicates with the pocket portion 30b. In the present embodiment, the orifice member 36a and the orifice member 36b constitute an orifice member incorporating the orifice forming groove 42.

After the orifice members 36a, 36b are attached to the integrally vulcanization molded component of the main rubber elastic body 16 in this way, the outer cylindrical member 14 is fitted externally onto the integrally vulcanization molded component of the main rubber elastic body 16. By so doing, the two circumferential ends of each of the orifice members 36a, 36b are clasped between the outer cylindrical member 14 and the intermediate sleeve 18.

In addition, the outer cylindrical member 14 is superposed against the outer peripheral face of the orifice members 36a, 36b via the seal rubber layer 32. With this arrangement, the outer peripheral side opening of the orifice forming groove 42 is fluid-tightly covered with the outer cylindrical member 14, thereby forming a tunnel-like passage. Accordingly, an orifice passage 48 for interconnecting the pair of fluid chambers 34a, 34b is provided by utilizing the orifice forming groove 42. The resonance frequency (tuning frequency) of the fluid flowing through the orifice passage 48 is adjusted by adjusting the ratio (A/L) of passage cross sectional area: A to passage length: L in consideration of the wall spring rigidity of the fluid chambers 34a, 34b. In the present embodiment, the frequency is tuned to low frequency of around 10 Hz corresponding to engine shake.

Meanwhile, in the diametrical direction along which the pair of pocket portions 30a, 30b are situated, the inner shaft member 12 and the outer cylindrical member 14 are opposed to each other with the orifice member 36 and the stopper rubber 44 interposed in between. When a load input allows the inner shaft member 12 to undergo appreciable displacement relative to the outer cylindrical member 14 in the direction along which the pair of pocket portions 30a, 30b are situated, the inner shaft member 12 comes into contact against the orifice member 36 in cushioned fashion via the stopper rubber 44. Since the orifice member 36 is superposed against the inner peripheral face of the outer cylindrical member 14, the inner shaft member 12 substantially comes into contact against the outer cylindrical member 14, whereby relative displacement of the inner shaft member 12 and the outer cylindrical member 14 will be limited in cushioned fashion. Accordingly, a stopper mechanism is provided for limiting relative displacement of the inner shaft member 12 and the outer cylindrical member 14 in the axis-perpendicular direction.

Furthermore, at the axially center section of the orifice passage 48, a reinforcing rib 50 is provided so as to project from the inner peripheral bottom face of the orifice forming groove 42 toward the outer peripheral side. As depicted in FIGS. 1 through 4, and FIG. 6, the reinforcing rib 50 is a solid ridge integrally formed with the orifice members 36a, 36b, and projects from the center section in the axial direction (lateral direction in FIG. 2) of the orifice forming groove 42 while extending in the circumferential direction with substantially unchanging cross section. Besides, the reinforcing rib 50 has a substantially unchanging widthwise dimension in the axial direction from its proximal end (inner peripheral end) to its distal end (outer peripheral end), with its projecting distal end face imparted with a tubular face having a prescribed width in the axial direction.

It should be appreciated that the reinforcing rib 50 is formed in the lengthwise medial section of the orifice forming groove 42, so that the reinforcing rib 50 does not reach the lengthwise opposite ends of the orifice forming groove 42. In other words, the reinforcing rib 50 is provided in the lengthwise medial section of the orifice passage 48 so as to extend in the circumferential direction with a prescribed length shorter than the passage length of the orifice passage 48. This means the reinforcing rib 50 is provided in a portion of the orifice passage 48.

Moreover, the reinforcing rib 50 projects at substantially identical height to the axially opposite walls of the orifice forming groove 42, so that its distal end face is in contact with the outer cylindrical member 14 via the seal rubber layer 32. With this arrangement, the axially center section of the orifice forming groove 42 is supported in contact with the outer cylindrical member 14.

By providing this reinforcing rib 50 to the orifice member 36, the orifice passage 48 is, in its circumferentially medial section, partitioned into sections equal in size with each other in the axial direction, forming two equal sections in the vertical direction. Accordingly, on the opposite sides of the reinforcing rib 50, there are formed a pair of passages that have same fluid flow characteristics. Having same fluid flow characteristics means that the passages have substantially the same flow resistance, the same resonance frequency of the flowing fluid, or the like, and during input of vibration, substantially the same amount of fluid will flow through each of the passages. In the present embodiment, the passages partitioned by the reinforcing rib 50 have shapes which are symmetry with respect to an axis-perpendicular plane that passes through the axial center. Thus, these passages have the same fluid flow characteristics as each other.

The suspension bushing 10 constructed in the above manner, by being mounted onto an automotive front suspension, for example, is adapted to provide vibration damping linkage of the suspension arm (not shown) to the vehicle body (not shown). Specifically, the inner shaft member 12 is attached to the vehicle body with bolts or the like while the outer cylindrical member 14 is secured press-fit into an arm eye formed in the suspension arm, whereby the suspension bushing 10 is adapted to be interposed between the vehicle body and the suspension arm.

When a low-frequency, large-amplitude vibration corresponding to engine shake is input across the inner shaft member 12 and the outer cylindrical member 14, the inner shaft member 12 undergoes displacement relative to the outer cylindrical member 14 in one diametrical direction along which the pair of fluid chambers 34a, 34b are situated. This will induce a fluid flow between the pair of fluid chambers 34a, 34b through the orifice passage 48 on the basis of relative pressure differential between the fluid chambers 34a, 34b. Accordingly, desired vibration damping effect (high attenuating or damping action) will be attained based on flow action of the fluid.

When the car drives over a bump or the like and a large load is input, the inner shaft member 12 comes into contact against the orifice member 36 via the stopper rubber 44. This will limit relative displacement between the inner shaft member 12 and the outer cylindrical member 14, thereby minimizing deformation of the main rubber elastic body 16. Therefore, it is possible to prevent damage such as cracking to the main rubber elastic body 16, so that durability will be improved. Note that owing to the plurality of grooves 46 formed on the inner peripheral face of the stopper rubber 44, the initial contact area is reduced and the cushioning action during the contact will be more effectively exhibited. In addition, the outer peripheral face of the inner shaft member 12 is covered with the cushioning rubber 24, so that the impact during the contact will be ameliorated by the cushioning rubber 24 as well.

When the inner shaft member 12 comes into contact against the orifice member 36 in this way, a contact load (stopper load) will be applied between the inner shaft member 12 and the orifice member 36. The orifice member 36, which is made of synthetic resin, is subjected to the contact load acting on the formation zone of the orifice forming groove 42 via the stopper rubber 44. In this respect, the orifice forming groove 42 includes the reinforcing rib 50 integrally formed with its inner peripheral bottom face and projecting toward the outer peripheral side, while the projecting distal end face of the reinforcing rib 50 is in contact with the inner peripheral face of the outer cylindrical member 14. With this arrangement, the inner peripheral bottom face of the orifice forming groove 42 is supported by the reinforcing rib 50, thereby reducing deformation of the orifice member 36 at the formation zone of the orifice forming groove 42. As a result, damage to the orifice member 36 due to its excessive deformation will be prevented, so as to improve its durability.

In the present embodiment in particular, the reinforcing rib 50 is formed at the axially center section of the orifice forming groove 42. Therefore, with regard to the portions situated axially opposite sides of the reinforcing rib 50, which are spaced apart from the outer cylindrical member 14, the axial dimension of one portion never exceeds that of the other portion. This means that the reinforcing rib 50 partitions the orifice forming groove 42 into sections equal in size with each other in the axial direction. This will effectively minimize flexural deformation of the orifice member 36 at the formation zone of the orifice forming groove 42, so that damage to the orifice member 36 will be more advantageously prevented.

Moreover, the reinforcing rib 50 is formed in the circumferentially medial section of the orifice forming groove 42 provided by the orifice member 36 that comes into contact against the inner shaft member 12 via the stopper rubber 44. Accordingly, the reinforcing rib 50 is able to efficiently receive the contact load applied by the contact with the inner shaft member 12. This will effectively reduce deformation of the orifice member 36, thereby avoiding damage to the orifice member 36. Furthermore, the reinforcing rib 50 has a length so as not to reach the circumferential opposite ends of the orifice forming groove 42, to which no stopper load will directly be input. Thus, the orifice passage 48 will obtain a sufficient passage cross sectional area at the connected sections to the fluid chambers 34a, 34b, thereby preventing the hindering of the fluid flow in the vicinity of openings into/out of the fluid chambers 34a, 34b caused by its turbulence or the like. Furthermore, the reinforcing rib 50 is provided only in the portion on which the stopper load is adapted to act. This will minimize increase in the mass of the orifice member 36 due to presence of the reinforcing rib 50.

Additionally, the reinforcing rib 50 is a solid ridge and has a substantially unchanging widthwise dimension in the axial direction from its proximal end to its distal end. Therefore, the reinforcing rib 50 is allowed to obtain a sufficient contact area against the outer cylindrical member 14 while ensuring rigidity of itself. This will prevent damage to the reinforcing rib 50 or the outer cylindrical member 14 caused by the stopper load, thereby effectively achieving desired stopper effect.

Besides, the orifice passage 48, in its circumferentially medial section, is partitioned by the reinforcing rib 50 into two passages situated on axially opposite sides thereof. In addition, the two passages are substantially identical with each other in shape and have substantially the same fluid flow characteristics as each other. Thus, at times of vibration input, substantially the same amount of fluid will flow through each passage at the same time, so that the entire orifice passage 48 inclusive of the two passages functions as a single passage. As a result, the orifice passage 48 will avoid change in its fluid flow characteristics (tuning frequency or the like) due to presence of the reinforcing rib 50, and is able to achieve desired vibration damping characteristics.

Furthermore, in the present embodiment, the reinforcing rib 50 extends in the circumferential direction with substantially unchanging cross section, so that the two passages partitioned by the reinforcing rib 50 extend in the circumferential direction without serpentining or changing in passage cross sectional area. This will avoid considerable change in flow resistance of the orifice passage 48 due to presence of the reinforcing rib 50, thereby effectively exhibiting desired vibration damping action owing to a smooth flow of the fluid through the orifice passage 48.

Referring next to FIGS. 10 through 13, there is depicted an orifice member 60 which constitutes an automotive suspension bushing according to a second embodiment of a fluid-filled cylindrical vibration-damping device constructed in accordance with the present invention. In the description hereinbelow, the suspension bushing according to the present embodiment, while not depicted in the drawings, has substantially the same structure as that of the first embodiment except the orifice member 60. Also, with regard to the orifice member 60 as well, components that are substantially identical with those of the orifice member 36 in the first embodiment will be assigned like symbols and not described in any detail.

Figure 11:
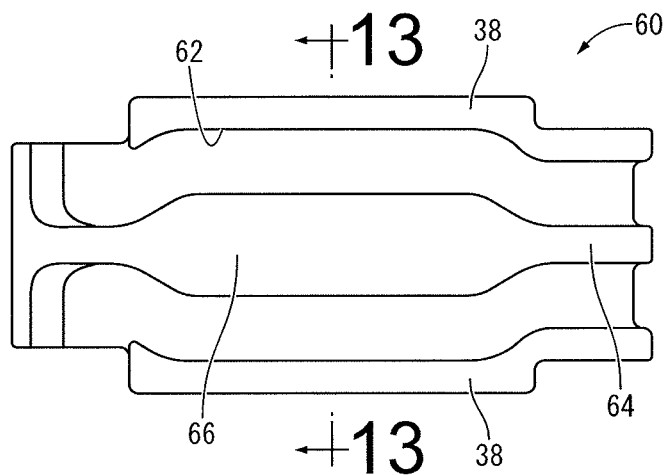
FIG. 11 is a top plane view of the orifice member of FIG. 10.
Figure 12:
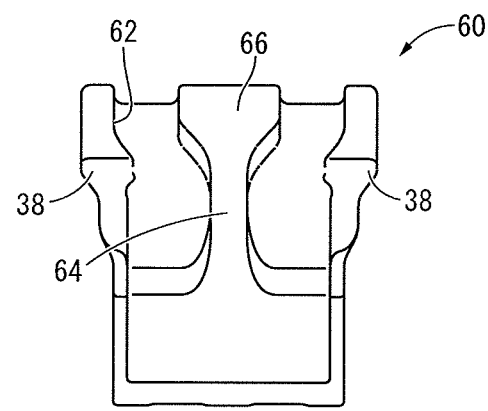
FIG. 12 is a left side view of the orifice member of FIG. 11.
Figure 13:
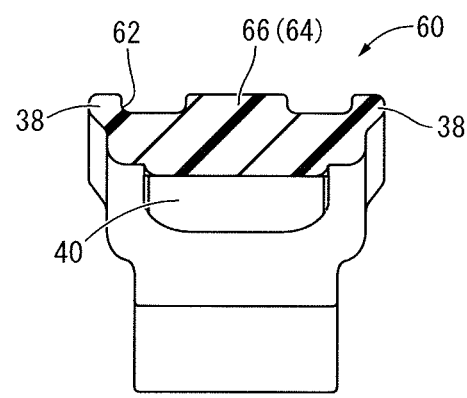
FIG. 13 is a cross sectional view taken along line 13-13 of FIG. 11.

Described more specifically, the orifice member 60 includes a divided orifice groove 62. The divided orifice groove 62 is a recessed groove that opens onto the outer peripheral face of the orifice member 60 and extends in the circumferential direction. As depicted in FIG. 11, one circumferential end of the divided orifice groove 62 (the right end in FIG. 11) opens onto the circumferential end face of the orifice member 60, while the other circumferential end thereof (the left end in FIG. 11) opens onto the two axial end faces of the orifice member 60. Moreover, the divided orifice groove 62 has a wider width in its circumferentially center section rather than in its circumferentially opposite ends, and these circumferentially center section and circumferentially opposite ends are smoothly connected with one another via tapered portions.

In addition, a reinforcing rib 64 is provided to the orifice member 60. The reinforcing rib 64 is a ridge that projects from the inner peripheral bottom face at the axially center section of the divided orifice groove 62 toward the outer peripheral side, and extends continuously across the entire length in the circumferential direction. The circumferentially center section of the reinforcing rib 64 is expanded in the axial direction in comparison with its circumferentially opposite ends, thereby defining an expanded pressure-receiving portion 66 having a wider width. The expanded pressure-receiving portion 66 is expanded by equal dimension to axially opposite sides so as to have a shape symmetry with respect to an axis-perpendicular plane that passes through the axial center. Also, with regard to the reinforcing rib 64, the circumferentially opposite ends with a narrower width and the circumferentially center section with a wider width are smoothly connected with one another via tapered portions. It should be appreciated that at the formation zone of the expanded pressure-receiving portion 66 of the reinforcing rib 64, the divided orifice groove 62 is also expanded. With this arrangement, the axially opposite passages in the orifice passage 48 partitioned by the reinforcing rib 64 both extend with substantially unchanging cross sectional area in the circumferential direction.

As in the orifice member 36 according to the first embodiment, the orifice member 60 is provided in pairs which are vertically inverted with respect to each other and then assembled together. By so doing, the divided orifice grooves 62 of respective orifice members 60 are interconnected, thereby forming the orifice forming groove 42. A similar arrangement is adopted for orifice members 70, 80 described later as well.

The suspension bushing incorporating this orifice member 60 is able to attain an effect comparable to the suspension bushing 10 in the first embodiment. That is, owing to the reinforcing rib 64, the axially center section of the divided orifice groove 62 is supported in contact with outer cylindrical member 14. This will minimize deformation of the orifice member 60 due to input of the stopper load, thereby improving durability.

In addition, the reinforcing rib 64 is expanded at its circumferentially center section so as to have the expanded pressure-receiving portion 66. This arrangement will obtain a larger contact area between the orifice member 60 and the outer cylindrical member 14 particularly at the circumferentially center section on which the contact load of the inner shaft member 12 is likely to act. Therefore, it is possible to effectively reduce the level of deformation of the orifice member 60, whereby damage to the orifice member 60 due to input of the stopper load will advantageously be prevented.

Moreover, in the orifice member 60, in order to conform to the reinforcing rib 64 having the expanded pressure-receiving portion 66 at its circumferentially center section, the orifice forming groove 42 is expanded at its circumferentially center section. By so doing, the two passages in the orifice passage 48 partitioned by the reinforcing rib 64 are prevented from being partially narrowed due to presence of the expanded pressure-receiving portion 66. Thus, a sufficient amount of the fluid flowing through the orifice passage 48 will be ensured.

Figure 14:
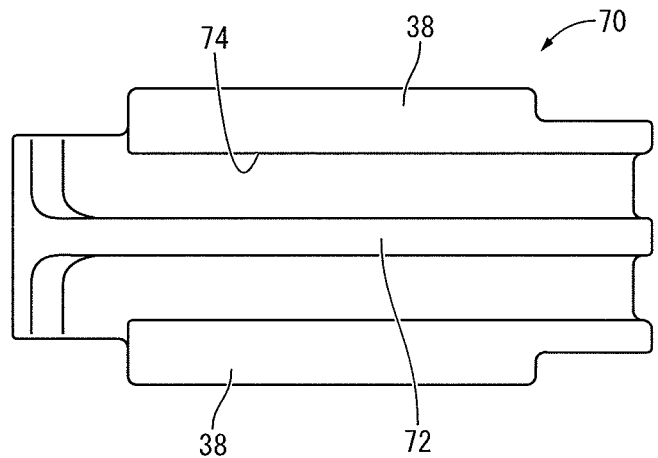
FIG. 14 is a top plane view of an orifice member of a suspension bushing according to another embodiment of the present invention.

While the present invention has been described in detail hereinabove in terms of the preferred embodiments, the invention is not limited by the specific disclosures thereof. For example, whereas the reinforcing rib 50 according to the first embodiment is provided only in the circumferentially medial section of the orifice forming groove 42, it may be provided continuously across the entire length in the circumferential direction, the same as the reinforcing rib 64 according to the second embodiment. That is, as an orifice member 70 depicted in FIG. 14, it would also be acceptable to employ a reinforcing rib 72 that extends with substantially unchanging cross sectional shape across the entire length in the circumferential direction of the orifice forming groove 42, which is constituted by divided orifice grooves 74, 74.

Figure 15:
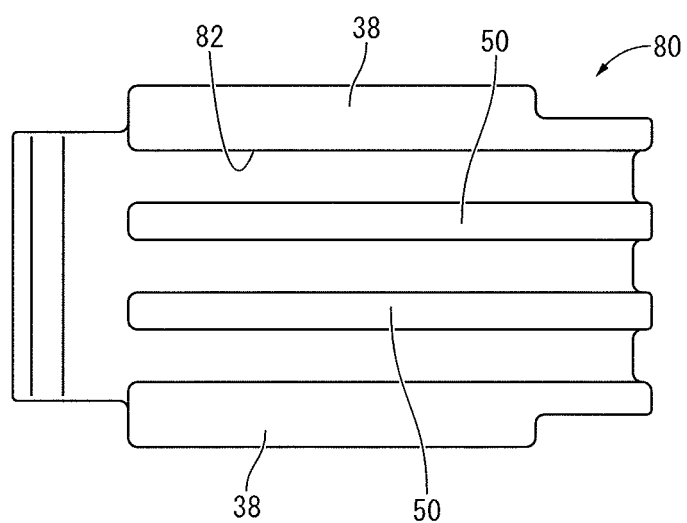
FIG. 15 is a top plane view of an orifice member of a suspension bushing according to yet another embodiment of the present invention.

Moreover, the number of the reinforcing rib provided within the orifice forming groove 42 is not necessarily limited to one, may be more than one. For example, as depicted in FIG. 15, an orifice member 80 includes two reinforcing ribs 50, 50 that project from the bottom face of a divided orifice groove 82 and are separated from each other in the axial direction. With this arrangement, the orifice forming groove 42, which is constituted by the divided orifice grooves 82, 82, is partitioned into three sections equal in size with one another in the axial direction by the reinforcing ribs 50, 50. In this way, even with a plurality of reinforcing ribs, the orifice member will be reinforced and be able to obtain a stable stopper effect while maintaining desired vibration damping characteristics, as long as the passages partitioned by the reinforcing ribs have substantially the same fluid flow characteristics as one another while ensuring desired passage cross sectional area for the orifice passage 48.

It is not necessary that the entire reinforcing rib extend continuously in the circumferential direction, but it would also be acceptable that a plurality of reinforcing ribs are provided intermittently in the circumferential direction, and each extend in the circumferential direction.

No particular limitation is imposed as to the cross sectional shape of the reinforcing rib. A tapered cross section which progressively constricts in width towards the projecting distal end side, a semicircular cross section, or the like may also be possible.

Besides, the stopper rubber 44 is not necessarily provided to the orifice member 36 side, but may alternatively be provided to the inner shaft member 12 side. If a stopper rubber is provided to the inner shaft member 12 side, the cushioning rubber 24 may be made thicker and utilized as the stopper rubber, for example.

Moreover, it would also be possible that a stopper member is attached to the inner shaft member 12 and projects in the axis-perpendicular direction, so that the stopper member comes into contact with the orifice member 36 thereby providing the stopper mechanism. That is, depending on the amount of relative displacement to be permitted between the inner shaft member 12 and the outer cylindrical member 14, a component for adjusting the distance between opposed faces of the inner shaft member 12 and the orifice member 36 may be disposed between the inner shaft member 12 and the orifice member 36.

While the above embodiments described a specific example of the present invention implemented in a suspension bushing, the fluid-filled cylindrical vibration damping device according to the present invention may be implemented advantageously in engine mounts, sub-frame mounts, or the like. Furthermore, the present invention is not limited to automotive fluid-filled cylindrical vibration-damping devices only, and may also be implemented, for example, as a fluid-filled cylindrical vibration-damping device for use in motorized two wheeled vehicles, rail vehicles, industrial vehicles or the like.

What is claimed is:

1. A fluid-filled cylindrical vibration-damping device comprising:
   an inner shaft member;
   an outer cylindrical member;
   a main rubber elastic body elastically connecting the inner shaft member and the outer cylindrical member, and having a plurality of pocket portions that open onto an outer peripheral face of the main rubber elastic body;
   a plurality of fluid chambers defined by covering the pocket portions with the outer cylindrical member and filled with a non-compressible fluid;
   at least one orifice member attached to an inner peripheral side of the outer cylindrical member so as to straddle openings of the pocket portions and extend in a circumferential direction, the at least one orifice member having an orifice forming groove that opens onto an outer peripheral face of the at least one orifice member and extends in the circumferential direction;
   an orifice passage for interconnecting the fluid chambers defined by covering an outer peripheral side opening of the orifice forming groove with the outer cylindrical member;
   a stopper rubber for limiting relative displacement of the inner shaft member and the outer cylindrical member in an axis-perpendicular direction being constituted by contact between the inner shaft member and the outer cylindrical member via the at least one orifice member, and the stopper rubber having an arcuate shape in the axis-perpendicular direction that conforms to an arcuate shape of an inside surface of the at least one orifice member in the axis-perpendicular direction; and
   a tubular intermediate sleeve having a pair of window portions,
   wherein a reinforcing rib is formed in the at least one orifice member so as to project from an inner peripheral bottom face of the orifice forming groove toward an outer peripheral side and extend in the circumferential direction while a projecting distal end face of the reinforcing rib is in contact with an inner peripheral face of the outer cylindrical member;
   wherein the reinforcing rib partitions at least a portion of a circumference of the orifice passage into a plurality of passages that have same fluid flow characteristics;
   wherein the inner shaft member and the intermediate sleeve are elastically connected by the main rubber elastic body;
   wherein the pocket portions of the main rubber elastic body comprise a pair of the pocket portions and open toward the outer peripheral side through the respective window portions of the intermediate sleeve;
   wherein the fluid chambers comprise a pair of the fluid chambers defined by the outer cylindrical member fitting externally onto the intermediate sleeve while covering the window portions;
   wherein the at least one orifice member comprises a pair of the orifice members each extending a length approximately equal to halfway around a circumference and being disposed so as to straddle the respective window portions in the circumferential direction;
   wherein two circumferential ends of each of the orifice members are clasped between the intermediate sleeve and the outer cylindrical member; and
   wherein the at least one orifice member is made thinner in the both circumferential end sections than in a circumferentially medial section so as to provide step portions at the both circumferential end sections, and the step portions engage a portion of the main rubber elastic body that surrounds the respective window portions of the intermediate sleeve in order to hold the at least one orifice member in place circumferentially.

2. The fluid-filled cylindrical vibration-damping device according to claim 1, wherein the reinforcing rib partitions at least the portion of the circumference of the orifice passage into sections equal in size with one another in an axial direction.

3. The fluid-filled cylindrical vibration-damping device according to claim 1, wherein the reinforcing rib is formed at an axially center section of the orifice forming groove and extends in the circumferential direction.

4. The fluid-filled cylindrical vibration-damping device according to claim 1, wherein the reinforcing rib is formed in a circumferentially medial section of the orifice forming groove.

5. The fluid-filled cylindrical vibration-damping device according to claim 1, wherein the orifice members are identical with each other in shape.

6. The fluid-filled cylindrical vibration-damping device according to claim 1, wherein the reinforcing rib has a substantially unchanging widthwise dimension in an axial direction from a proximal end to a distal end thereof.

7. The fluid-filled cylindrical vibration-damping device according to claim 1, wherein the reinforcing rib extends in the circumferential direction with substantially unchanging cross section.

8. The fluid-filled cylindrical vibration-damping device according to claim 1, further comprising a plurality of grooves formed on an inner surface of the stopper rubber at given intervals in the circumferential direction and extending in the axial direction.

9. The fluid-filled cylindrical vibration-damping device according to claim 1, wherein the plurality of passages which are partitioned by the reinforcing rib have the same resonance frequency of flowing fluid.

10. The fluid-filled cylindrical vibration-damping device according to claim 1, further comprising an anchor portion of convex shape projecting from a circumferentially medial section of the inside surface of the at least one orifice member, wherein the stopper rubber is anchored to the at least one orifice member so as to cover the anchor portion, and the at least one orifice member is made thicker in the circumferentially medial section than at both circumferential end sections thereof.

\* \* \* \* \*